Sept. 24, 1968          D. E. KELLY          3,402,888
PILOT CONTROLLED PRESSURE OPERATED WATERLINE THERMOSTAT
Filed Feb. 14, 1967
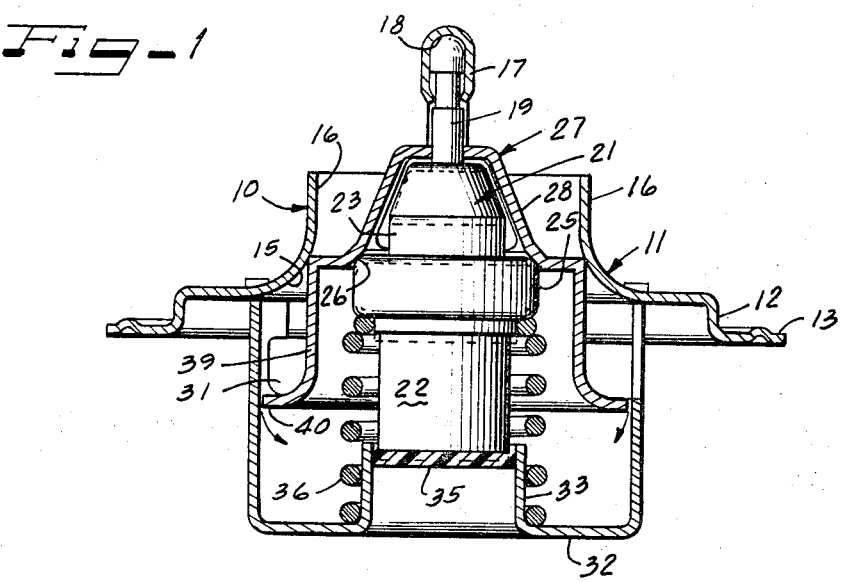
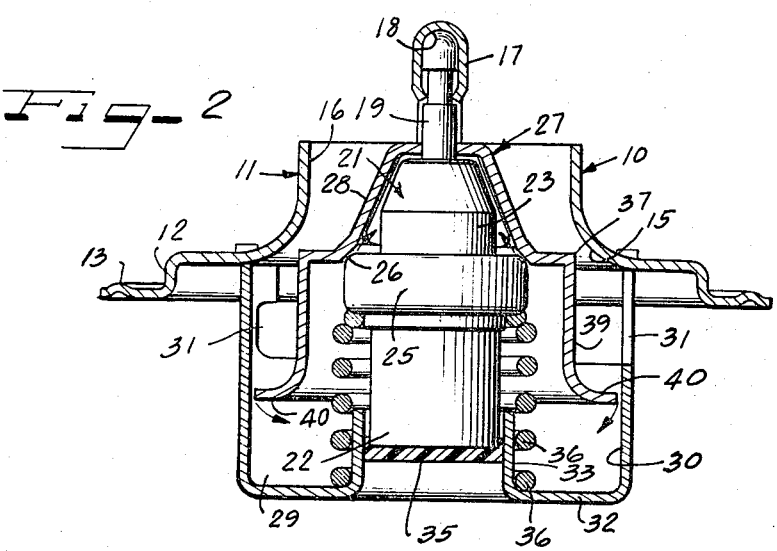
INVENTOR.
DOUGLAS E. KELLY
BY      ATTORNEYS

United States Patent Office 3,402,888
Patented Sept. 24, 1968

3,402,888
PILOT CONTROLLED PRESSURE OPERATED
WATERLINE THERMOSTAT
Douglas E. Kelly, Northfield, Ill., assignor to The Dole Valve Company, Morton Grove, Ill., a corporation of Illinois
Filed Feb. 14, 1967, Ser. No. 616,064
9 Claims. (Cl. 236—34)

ABSTRACT OF THE DISCLOSURE

Pilot controlled pressure operated waterline thermostat for the coolant for internal combustion engines, in which fluid under pressure in a balancing chamber balances the valve and a temperature responsive element meters fluid from the balancing chamber upon increases in temperature, to unbalance the valve and accommodate opening of the valve by pressure.

---

This invention relates to improvements in thermostatic coolant control valves and more particularly relates to an improved form of pilot controlled pressure operated waterline thermostatic valve.

Summary of invention and objects

Waterline thermostatic valves for controlling the temperature of the coolant of an internal combustion engine and operated by power or solid types of temperature sensitive elements have been in common use for many years. Such waterline thermostats, however, depend principally on temperature to open and close the valve and the temperature responsive element of the valve is materially affected by pressure on the valve. This leads to relatively poor temperature control.

The waterline thermostat of the present invention differs from those of the prior art in that the thermostatic valve is a balanced valve and opens upon increases in temperature by the metering of fluid from one side of the valve to the other under control of the temperature responsive element of the valve, unbalancing the valve and effecting opening of the valve by pressure.

A principal object of the present invention, therefore, is to provide a simple and improved form of waterline thermostatic valve leading to better temperature control, by balancing the valve and metering pressure from one side of the valve to the other under control of the temperature responsive element for the valve, to effect opening of the valve by pressure, as the temperature of the coolant increases beyond a predetermined value.

Another object of the invention is to improve upon the thermostatic valves heretofore in use to control the flow and temperature of coolants for internal combustion engines, by balancing the valve and utilizing the temperature responsive element as a pilot valve, to meter fluid from one side of the valve to the other, upon increases in temperature, to thereby effect opening of the valve by pressure.

A still further object of the invention is to provide a novel and improved form of pilot controlled pressure operated waterline thermostatic valve, in which the temperature responsive element controlling opening and closing of the valve is a power or solid type of element, and has an extensible power member floatingly carrying the valve, in which the temperature responsive element is enclosed in a closed pressure chamber and the valve controlling the flow of coolant has a portion spaced from the valve face, accommodates a continuous leakage of fluid into the closed chamber to maintain a balanced pressure on opposite sides of the valve, and in which the temperature responsive element serves to meter fluid from the closed chamber upon increases in temperature, to thereby unbalance the valve and effect opening of the valve by pressure.

These and other objects of the invention will appear from time to time as the following specification proceeds and with reference to the accompanying drawings.

Description of the drawings

FIGURE 1 is a transverse sectional view taken through a pilot operated waterline thermostatic valve constructed in accordance with the principles of the present invention showing the valve in its closed position; and FIGURE 2 is a transverse sectional view like FIGURE 1 but showing the valve in its open position.

Description of the preferred embodiment

In the embodiment of the invention illustrated in the drawings, a pilot operated waterline thermostat is generally designated by reference character 10 and is adapted for mounting in the cylinder head of an internal combustion engine for controlling the flow and temperature of coolant in the cylinder block of the engine. The thermostat 10 generally comprises a valve casing 11 having a downwardly stepped outer peripheral portion 12, terminating into a radially extending flange 13, adapted to be mounted in and sealed to the cylinder head of an internal combustion engine. The casing 11 has a converging curvilinear throat 15, converging to an outlet conduit 16. The outlet conduit 16 has a stirrup 17 extending thereacross and shown in FIGURES 1 and 2 as spaced downstream from the end of the casing and having a socket 18 at its center, forming a seat for a power member 19 of a temperature responsive element 21.

The temperature responsive element 21 is shown as being of a well known "solid-fill" type of element in which a fusible thermally expansible material such as a wax or a wax and a powdered metal heat conducting material and a binder, contained within a casing 22 of the element, reacts against a flexible membrane (not shown) at the upper end of the casing to extend the power member 19 from a cylinder 23. The casing 22 is surrounded at its upper end by a collar 25 engageable at its downstream end with a frusto-conical metering seat 26 formed on the interior of a valve 27, for the thermostat. The valve 27 has a ported frusto-conical downstream end portion 28, loosely mounted on the power member 19. The collar 25 in cooperation with the metering seat 26 forms a pilot or metering valve, metering fluid from a pressure chamber 29 on the downstream side of the valve 27, upon increases in temperature.

The pressure chamber 29 has a lower or upstream imperforate cylindrical wall 30 having a plurality of ports 31 leading therethrough upstream of said pressure chamber accommodating the flow of fluid along the throat 15 and through the outlet conduit 16. The pressure chamber 29 also has an imperforate annular wall 32 at its bottom or upstream end, shown as terminating into an inner cylindrical guide 33 for the casing 22 of the temperature responsive element 21. The casing 22 is sealed to the interior wall of the guide 33 as by a generally cup-like seal 35 mounted on the bottom of said casing and extending upwardly along the wall thereof and slidably guided along the interior wall of the guide 33, to accommodate movement of said casing along said wall, upon changes in temperature and to seal said casing against the passage of fluid between said guide and casing. The seal 35 may preferably be made from a plastic sealing material which also has lubricating qualities. A biasing spring 36 encircles the exterior or wall of the guide 33 and is seated on the bottom 32 at one end and on the upstream side of the collar 25 at its opposite end to bias the collar 25 into engagement with the valve seat 26. The spring 36 also biases an annular main valve surface 37 of the valve 27 into engagement with the converging curvilinear wall portion of the throat 15, to shut off the flow of fluid through the casing 11.

Depending from the valve 37 and formed integrally therewith is a generally cylindrical skirt 39 flaring outwardly at its lower end portion into an annular flange 40 spaced upstream of the ports 31 in all positions of the valve. The flange 40 has relatively close clearance with the interior wall 30 of the pressure chamber 29 and accommodates the leakage of fluid through the ports 31 past said annular flange into the pressure chamber 29, to maintain pressure in said pressure chamber and balance the valve.

As the temperature of the coolant increases, the power member 19 of the temperature responsive element 21, acting against the socket 18 of the stirrup 17 will effect retractible movement of the casing 22 and collar 25 with respect to the frusto-conical metering seat 26. This will meter fluid to the downstream side of the valve and unbalance pressure on opposite sides of the valve 27. The valve 27 will then open under pressure and under control of the temperature sensitive element 21, it being understood that the valve 27 is loosely mounted on the power element 19 to accommodate movement of the collar 25 and temperature responsive element away from said valve, and to also accommodate pressure on the valve to cause the valve to follow the temperature responsive element and close the metering seat, to again effect a balance in pressure on opposite sides of the valve. These balanced and unbalanced pressure conditions, controlled by engagement of the temperature responsive element with the metering seat 26, and by leakage past the annular flange 40 may continue for the full temperature range of operation of the valve, effecting opening and closing of the main valve by pressure controlled by the metering of fluid past the metering seat 26, by the temperature responsive element 21.

The main valve is thus opened by pressure and the temperature responsive element 21 is unaffected by pressure, with a resultant more accurate temperature control in a simple and effective manner.

While I have herein shown and described one form in which the invention may be embodied, it should be understood that various variations and modifications in the invention may be attained without departing from the spirit and scope of the novel concepts thereof.

I claim as my invention:

1. In a coolant control waterline thermostatic valve,
   a valve casing for mounting in the cylinder head of an internal combustion engine and having
      a throat converging in a downstream direction,
      said throat forming a valve seat,
      a pressure chamber extending from said throat in an upstream direction and having a cylindrical wall having an imperforate upstream portion and having a downstream portion having ports leading therethrough,
      a temperature responsive element guided in said pressure chamber,
      a valve carried by said temperature responsive element having a valve face seated on said throat to prevent the passage of coolant through said throat,
      and having a metering portion spaced upstream of said valve face and terminating closely adjacent the wall of said pressure chamber, to accommodate the leakage of fluid under pressure to maintain pressure in said chamber on the underside of said valve,
      said valve having an internal metering seat cooperating with said temperature responsive element to accommodate the metering of fluid from said pressure chamber upon increases in temperature, and to thereby accommodate pressure on the downstream side of said valve to move said valve to an open position.

2. The structure of claim 1,
   wherein the temperature responsive element is a power type temperature responsive element sealed to said pressure chamber,
   wherein the valve is mounted on said temperature responsive element for relative movement with respect thereto, and
   wherein said metering portion is upstram of said ports for the full extent of travel of said valve in a valve opening direction.

3. The structure of claim 1,
   wherein the temperature responsive element has slidable sealing engagement with said metering chamber, and
   wherein spring means bias said temperature responsive element into sealing engagement with said metering seat.

4. The structure of claim 1
   wherein the pressure chamber has an imperforate bottom wall having a cylindrical guide extending therefrom in a downstream direction,
   wherein said temperature responsive element has a casing slidably sealed to said guide and has a collar engageable with said metering seat,
   wherein a stirrup extends across said throat, and a power member reacting against said stirrup forms a mounting for said valve, and accommodates movement of said valve along said power member, and
   wherein said collar in cooperation with said metering seat forms a pilot valve to meter fluid from the pressure chamber on increases in temperature to thereby unbalance said valve and effect opening of the valve by pressure, under the control of said temperature responsive element.

5. The structure of claim 4,
   wherein the casing has a cup-like seal on the end thereof having slidable sealing engagement with said guide, and
   wherein spring means bias said collar into sealing engagement with said seat.

6. The structure of claim 4,
   wherein the valve has a downstream hollow frusto-conical portion having a wall extending across the small diameter end thereof and slidably mounted on said power member and has a radial portion extending from the large diameter end of said frusto-conical portion, and forming a valve face at its edge,
   wherein said frusto-conical portion has a ported portion downstream of said valve face,
   wherein the interior of said frusto-conical portion forms said metering seat upstream of the ported portions of said frusto-conical face, and
   wherein spring means bias said collar into engagement with said metering seat and bias said valve face into engagement with said converging wall portion of said throat.

7. The structure of claim 6,
   wherein the casing has a cup-like seal on the end thereof having slidable sealing engagement with said guide.

8. The structure of claim 1,
   wherein the temperature responsive element is a solid-fill type of element having a cylindrical casing and an extensible power member,
   wherein the pressure chamber has an upstream wall having a central cylindrical guide extending therefrom in a downstream direction,
   wherein a stirrup extends across said throat,
   wherein said power member is seated on said stirrup and said casing is sealed to and guided for movement along said cylindrical guide,
   wherein the valve has a hollow frusto-conical portion having a wall extending across the small diameter end thereof and slidably mounted on said power member concentric with the center of said wall, and having a radial flange extending from the large diameter end of said wall, wherein the periphery of said radial flange forms said valve face, wherein an imperforate skirt extends from said radial flange in an upstream direction, wherein said skirt diverges to a radial flange extending closely adjacent said pressure chamber and accommodating the leakage of fluid under pressure into said pressure chamber, to maintain pressure on the underside of said valve, wherein the internal metering seat is formed by the interior frusto-conical wall portion of said valve, and is engaged by said temperature responsive element to block the passage of fluid under pressure therethrough, and wherein the frusto-conical wall portion of said valve has ports leading therethrough to accommodate the metering of fluid to the downstream side of said valve upon increases in temperature of the coolant to unbalance said valve to accommodate opening of said valve by pressure.

9. The structure of claim 8, wherein the temperature sensitive element has a sealing cup on the end thereof having slidable sealing engagement with said guide, and wherein spring means encircling said guide and casing, bias said temperature sensitive element into engagement with said metering seat, and bias said valve face into engagement with said throat.

References Cited

UNITED STATES PATENTS

| | | | |
|---|---|---|---|
| 2,200,318 | 5/1940 | Yonkers | 236—34 |
| 2,400,911 | 5/1946 | Booth | 236—34.5 |
| 2,770,440 | 11/1956 | Woods | 236—34 |

EDWARD J. MICHAEL, *Primary Examiner.*